United States Patent [19]

Herb

[11] 4,312,611
[45] Jan. 26, 1982

[54] FASTENING ELEMENT ASSEMBLY WITH A SPREADING WEDGE

[75] Inventor: Armin Herb, Peissenberg, Fed. Rep. of Germany

[73] Assignee: Hilti Aktiengesellschaft, Fürstentum, Liechtenstein

[21] Appl. No.: 133,985

[22] Filed: Apr. 26, 1980

[30] Foreign Application Priority Data

Apr. 2, 1979 [DE] Fed. Rep. of Germany ....... 2913090

[51] Int. Cl.³ ................. F16B 13/04; F16B 13/08
[52] U.S. Cl. ................................. 411/9; 411/39; 411/79; 411/449; 411/469
[58] Field of Search .............. 411/24, 25, 26, 27, 411/28, 39, 40, 41, 42, 43, 75, 76, 77, 78, 79, 80, 8, 9, 10, 446, 447, 448, 449, 469

[56] References Cited

U.S. PATENT DOCUMENTS

| | | | |
|---|---|---|---|
| 741,563 | 10/1903 | Stevens et al. | 411/79 |
| 2,748,594 | 6/1956 | Edwards | 411/76 |
| 3,172,329 | 3/1965 | Setzler | 411/41 |
| 3,285,120 | 11/1966 | Kartiala | 411/8 |
| 3,518,915 | 7/1970 | Gutshall | 411/39 |
| 3,521,522 | 7/1970 | Zoldok | 411/75 |
| 3,802,311 | 4/1974 | Ziegler | 411/76 |
| 3,894,469 | 7/1975 | Nilsson | 411/40 |
| 3,974,621 | 8/1976 | Stang | 411/75 |
| 4,037,512 | 7/1977 | Sundberg | 411/449 |
| 4,156,381 | 5/1979 | Schiefer | 411/40 |

FOREIGN PATENT DOCUMENTS

| | | | |
|---|---|---|---|
| 127529 | 11/1945 | Australia | 411/41 |
| 1056643 | 5/1959 | Fed. Rep. of Germany | |
| 2316163 | 10/1973 | Fed. Rep. of Germany | 411/76 |
| 1191515 | 4/1959 | France | 411/75 |
| 2266039 | 10/1975 | France | 411/75 |

*Primary Examiner*—Thomas J. Holko
*Attorney, Agent, or Firm*—Toren, McGeady & Stanger

[57] ABSTRACT

A fastening element assembly consists of an anchoring bolt and a spreading wedge. After the assembly is inserted into a prepared borehole, by driving the spreading wedge inwardly relative to the anchoring bolt, the bolt is secured in the borehole. To ensure that it is driven into the borehole for a sufficient distance, the spreading wedge is provided with a separating web intermediate its ends so that if a predetermined breaking point of the separating web is reached, the web breaks and the rear part of the wedge can be driven into the borehole relative to the forward part.

9 Claims, 6 Drawing Figures

FASTENING ELEMENT ASSEMBLY WITH A SPREADING WEDGE

SUMMARY OF THE INVENTION

The present invention is directed to a fastening element assembly including an anchoring bolt and a spreading wedge with a flange located on the trailing end of the bolt for applying load to the bolt. The forward portion of the anchoring bolt has a wedge surface so that the transverse cross-section of the bolt increases toward its leading end. The spreading wedge has a complementary wedge surface in sliding engagement with the wedge surface on the anchoring bolt so that the spreading wedge slides forwardly over the anchoring bolt when it is driven into a borehole. Before the spreading wedge is driven relative to the anchoring bolt, the outer surfaces of each combine to form a circular cross-section.

In placing fastening elements of the above-mentioned type, usually the element is inserted into a borehole until a flange on the anchoring bolt bears against the member to be fastened. In this initial position of the fastening element, the spreading wedge projects outwardly from the trailing end of the anchoring bolt for a certain distance. In the spreading operation, the spreading wedge is driven into the borehole relative to the anchor bolt until its trailing end is flush with the trailing end of the bolt. When the borehole is correctly dimensioned, the wedging or anchoring of the fastening element in the borehole required for the appropriate holding power is obtained.

Due to wear of the drilling tool, it is possible that the diameter of the borehole is somewhat smaller than is normally required for the fastening element. As a result, the spreading wedge cannot be fully driven in using the normal force and its trailing end is not flush with the trailing end of the anchoring bolt. If the driving in force is increased, the spreading force acting on the fastening element in the borehole also increases. It may happen that the spreading pressure developed at the surface of the borehole exceeds the resistance pressure of the material in which the borehole is formed. When this occurs, the structure of the material containing the borehole is destroyed. Accordingly, the support force of the fastening element falls to a minimum value.

Therefore, it is the primary object of the present invention to provide a fastening element assembly of the abovementioned type with a controllable spreading action.

In accordance with the present invention, the controllable spreading action is achieved by forming a separating web in a mid-portion of the spreading wedge spaced between its leading and trailing ends so that the web affords a predetermined breaking point permitting the trailing portion of the spreading wedge to move forwardly relative to the leading portion of the wedge.

The force required to fracture the separating web at the predetermined breaking point can be controlled by proper dimensioning of the web in accordance with the resistance to pressure of the receiving material into which the borehole is formed. After the web has fractured at the predetermined breaking point, the trailing portion of the spreading wedge can be driven into the borehole relative to its forward portion until its trailing end is flush with the trailing end of the anchoring bolt and this driving in action can be achieved without increasing the spreading pressure within the borehole. Therefore, in accordance with the present invention, it is impossible for the fastening element to be overspread and, thus, exceed the resistance to pressure of the receiving material.

There are various ways in which the predetermined breaking point can be formed. In one advantageous embodiment, the separating web is formed between two notches or grooves cut into the spreading wedge with the grooves being offset in the axial direction of the wedge and extending inwardly toward one another from opposite sides of the spreading wedge. Such grooves can be easily produced without any special tools or methods. By spacing the grooves apart in the axial direction of the spreading wedge, a separating web extends between the grooves which is subjected to shearing strain as the spreading wedge is driven into the borehole. In the case of shearing strain, the separating web breaks practically without any plastic deformation when the required shearing force is reached. After the separating web breaks, because of the arrangement of the grooves, the trailing portion of the spreading wedge overlaps the leading portion and the two portions are jammed or locked together in the borehole and prevent the trailing portion of the spreading wedge from falling out of the borehole.

In another advantageous embodiment separating webs are formed between two grooves extending inwardly toward one another from opposite sides of the spreading wedge and by a throughopening offset in the axial direction relative to the grooves with the width of the opening being substantially the same as the spacing between the grooves. The separating webs extend between the inner ends of the grooves and the through opening. These separating webs are also subjected to shearing strain when the spreading wedge is driven into the borehole. By distributing the shearing strain over two separating webs, predetermined breaking points are provided which reduce the influence of possible manufacturing tolerances. In addition, this arrangement facilitates a jamming or locking connection between the leading portion and trailing portion of the spreading wedge which is independent from the surface of the borehole. By this arrangement, it is possible to prevent the trailing portion of the spreading wedge from falling out of the borehole, for example, when the fastening element assembly is placed in a ceiling. The throughopening and the grooves can be produced in a punching operation.

The grooves forming the separating webs can be located at any position as far as the separating procedure itself is concerned. For effecting as simple a production as possible of the spreading wedge, however, it is advantageous when the bottom surfaces of the grooves extend substantially perpendicularly relative to the wedge surface of the spreading wedge. Such an arrangement facilitates the formation of the grooves and, if applicable, of the through-opening, in a single punching operation.

In the use of the fastening element assembly, a subsequent spreading under load is desired. To achieve such spreading, it is advantageous if the bottom surfaces of the grooves extend approximately parallel to the wedge axis. As a result, it is possible to avoid having the spreading wedge locked with the anchoring bolt in the region of the separating web so that both the bolt and wedge are not pulled out together when a load is applied to the bolt.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the Drawing:

FIG. 1 is a perspective view of a fastening element assembly embodying the present invention in the condition of the assembly before the spreading wedge is driven in;

DETAIL DESCRIPTION OF THE INVENTION

Figure 1:
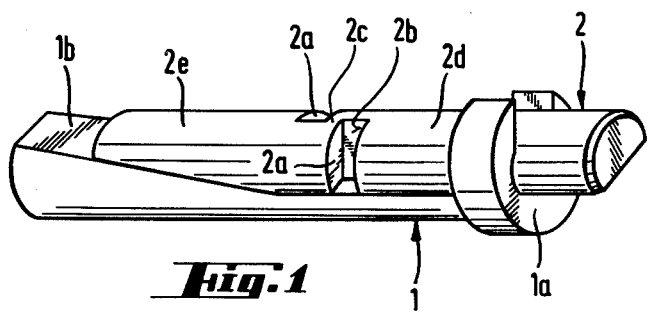

As shown in FIG. 1, the fastening element assembly embodying the present invention includes an axially elongated anchoring bolt and an axially elongated spreading wedge with the spreading wedge being in surface contact with the anchoring bolt. As viewed in FIG. 1 the left-hand end of the fastening element assembly represents the leading end of the anchoring bolt 1 and the spreading wedge 2 while the right-hand end represents the trailing end of each of these parts. At its trailing end, the anchoring bolt 1 has an outwardly extending flange 1a which acts as the member for applying load to the bolt. Each of the anchoring bolt 1 and the spreading wedge 2 has a partly circular outer surface extending for the axial length thereof. The combination of the circular outer surfaces of the anchoring bolt 1 and the spreading wedge 2 form a circular outer surface for the fastening element assembly in the first or unspread position shown in FIG. 1. The leading end portion of the anchoring bolt 1 has a planar wedge surface 1b extending from the leading end for approximately half of the axial length of the bolt. At the leading end, the wedge surface is chordally arranged between the ends of the outer surface. At the leading end of the anchoring bolt 1 the circular outer surface extends for a major portion of the circular shape of the fastening element assembly. Between the leading end and the mid-point at which the wedge surface 1b terminates, the transverse cross-section of the leading end portion of the anchoring bolt decreases to the mid-point. From the midpoint to the flange 1a at the trailing end of the anchoring bolts, a planar surface extends in generally parallel relation with the axis of the circular outer surface of the fastening element assembly. The spreading wedge 2 complements the anchoring bolt 1 in the unspread position shown in FIG. 1 with the outer surfaces of the two parts forming a continuous circular outer surface for the fastening element assembly. Since the leading end portion of the anchoring bolt has a decreasing cross-section in the direction from the leading end toward the trailing end, the leading end portion of the spreading wedge 2 has an increasing transverse cross-section from its leading end to the transverse plane at which its wedge surface contacting the wedge surface 1b of the anchoring bolt terminates. From the end of the wedge surface of the spreading wedge closer to the trailing end, the surface of the spreading wedge contacting the planar surface of the anchoring bolt is also planar and is disposed generally parallel to the axis of the fastening element assembly. As indicated in FIG. 1, prior to the insertion of the fastening element assembly into a borehole, the trailing end of the spreading wedge projects rearwardly from the trailing end of the anchoring bolt 1. As can be seen in the drawing, the spreading wedge extends through the flange 1a of the anchoring bolt 1.

When the fastening element assembly embodying the present invention is placed in a borehole, the flange 1a on the anchoring bolt 1 is placed in contact with the surface of the receiving material into which the borehole is formed. Subsequently, the spreading wedge 2 is driven over the anchoring bolt into the borehole until its trailing end is flush with the trailing end of the anchor bolt. As the spreading wedge 2 is driven forwardly its wedge surface slides along the wedge surface 1b of the anchoring bolt 1 providing an increased cross-sectional area for the combination of the anchoring bolt and the spreading wedge for securing the fastening element assembly within the borehole. To prevent overspreading of the fastening assembly during this driving-in operation, the spreading wedge 2 in its middle portion, rearwardly of the wedge surface thereon, has two grooves 2a offset from one another in the axial direction with each groove extending inwardly from an opposite side of the spreading wedge with the bottom surface of each wedge terminating in approximately the same plane. The bottom surface 2b of each of the grooves 2a extends substantially perpendicular relative to the wedge surface 1b of the anchoring bolt 1. Since the grooves are spaced axially apart by a small dimension, a thin separating web 2c is formed between the inner or bottom surfaces of the grooves. This thin separating web 2c serves as a predetermined breaking point for the spreading wedge 2. When the resistance to the movement of the spreading wedge 2 into the borehole exceeds a certain value, the separating web 2c shears or is broken and the trailing portion 2d of the spreading wedge moves forwardly into the borehole relative to the leading portion 2e which is held against forward movement because of the resistance developed by the material forming the borehole. This movement of the trailing portion 2d relative to the leading portion 2e prevents overspreading of the fastening element assembly in a borehole which may have a smaller diameter than the intended diameter for the specific fastening element assembly.

Figure 2:
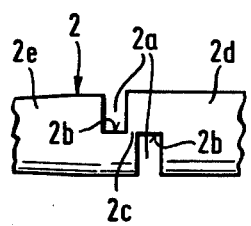
FIG. 2 is a partial side view of the spreading wedge shown in FIG. 1 before the separating web is broken.

In FIG. 2 a top view is shown of the two grooves 2a formed in the spreading wedge 2 of FIG. 1 with the separating web 2c extending between the juxtaposed ends of the grooves. Each groove extends into the separating wedge approximately to the center of the transverse cross-section of the wedge.

Figure 3:
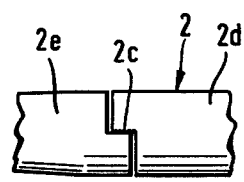
FIG. 3 is a side view, similar to FIG. 2, showing the spreading wedge after the separating web has been broken.

In FIG. 3 the spreading wedge 2 is shown after the separating web 2c has been broken. With the separating wedge broken, the trailing portion 2d of the spreading wedge rides forwardly into the groove 2a formed in the rear end of the leading portion 2e. This movement permits the trailing portion of the spreading wedge 2 to move into the borehole without causing any overspreading due to further forward movement of the leading portion 2e.

Figure 4:
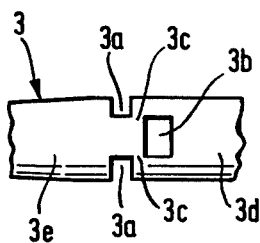
FIG. 4 is a view similar to FIG. 2 showing another embodiment of the spreading wedge with the separating webs being illustrated prior to being broken.

In FIG. 4 another embodiment of the grooves in a spreading wedge 3 is shown. The grooves 3a extend from the opposite sides into the spreading wedge 3 in alignment with one another, unlike the embodiment shown in FIGS. 1, 2 and 3 where the grooves are spaced closely apart in the axial direction of the fastening element assembly. Further, unlike the previous embodiment, the bottom or inner surfaces of the grooves 3a do not extend to the center of the transverse cross-section of the spreading wedge 3. The bottom surfaces of the grooves are spaced a considerable distance apart. Further, spaced axially rearwardly of the grooves is a through-opening 3b which has a width corresponding approximately to the spacing between the bottom or inner surfaces of the grooves 3a. The through-opening 3b is spaced a distance from the grooves 3a so that two separating webs 3c are formed between the adjoining corners of the through-opening 3b and of the grooves 3a. These separating webs are designed as predetermined breaking points. When the strength of the separating webs 3c is exceeded as the spreading wedge 3 is driven into a borehole, the webs fracture and permit the trailing portion 3d of the spreading wedge to move forwardly into the borehole relative to the leading portion 3e.

Figure 5:
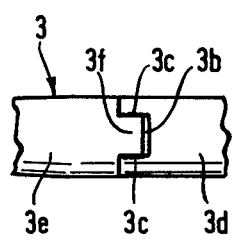
FIG. 5 is a view similar to FIG. 4, however, showing the separating webs broken.

In FIG. 5, the separating webs have been broken and the trailing portion 3d of the spreading wedge 3 has advanced in its axial direction relative to the leading portion 3e. After the separating webs 3c break, the part of the leading portion 3e between the grooves 3a forms a plug or tenon 3f which moves into the through-opening 3b as the trailing portion 3d moves forwardly. Accordingly, a connection is provided between the trailing portion 3d and the leading portion 3a of the spreading wedge 3. This interconnection prevents the trailing portion 3d from falling out of the borehole, particularly when the fastening element assembly is mounted in a ceiling.

Figure 6:
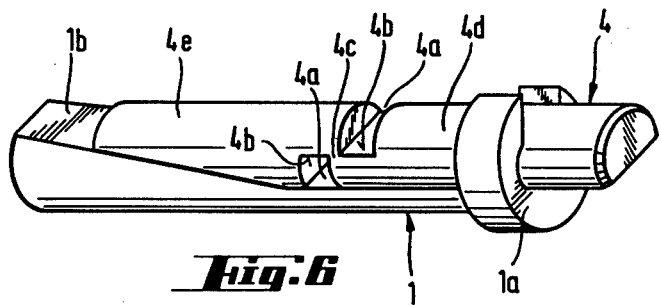
FIG. 6 is a perspective view, similar to FIG. 1, of still another embodiment of the spreading wedge, in accordance with the present invention.

The fastening element assembly illustrated in FIG. 6 consists of the anchoring bolt 1 with the flange 1a at its trailing end and a spreading wedge 4 which is connected to the anchor bolt by the flange. The anchoring bolt 1 and spreading flange 4 have the same general configuration as shown in FIG. 1, however, there is a difference in the arrangement of the grooves 4a which extend through the spreading wedge transversely of the axial direction of the assembly from one side to the other. As with the arrangement shown in FIGS. 1, 2 and 3 the grooves are spaced apart in the axial direction of the fastening element assembly. Further, unlike the other embodiments, the bottoms 4b of the grooves extend approximately parallel to the planar surface of the anchoring bolt extending from the trailing end of the wedge surface 1b toward the trailing end of the bolt. Because of the axially spaced relation of the grooves 4a, a separating web 4c is provided between them. When the resistance to further movement of the spreading wedge 4 into a borehole exceeds a certain value, the separating wedge 4c is broken and, as a result, the trailing portion 4d of the spreading wedge 4 moves forwardly relative to the leading portion 4e. By arranging the bottoms 4b of the grooves 4a approximately parallel to the planar surface of the anchor bolt extending rearwardly from the wedge surface 1b, it is possible to avoid having the spreading wedge locked with the anchoring bolt in the region of the separating web 4e. Accordingly, any subsequent spreading of the fastening element assembly is prevented.

While specific embodiments of the invention have been shown and described in detail to illustrate the application of the inventive principles, it will be understood that the invention may be embodied otherwise without departing from such principles.

What is claimed is:

1. An axially elongated fastening element assembly arranged to be inserted into a borehole, said fastening element assembly comprising an axially elongated anchoring bolt and an axially elongated spreading wedge, said spreading wedge being displaceable in the axial direction relative to said anchoring bolt between a first position where the fastening element assembly can be removably inserted into a borehole and a second position where said spreading wedge is displaced axially relative to said anchoring bolt for securing said anchoring bolt within the borehole, said anchoring bolt and spreading wedge each having a leading end which is inserted first into the borehole and a trailing end spaced in the axial direction from the leading end, means on the trailing end of said anchoring bolt for applying a load thereto, said anchoring bolt and spreading wedge combining to form an axially extending cylindrically shaped outer surface of the fastening element assembly with each forming a portion of the cylindrically shaped outer surface, said anchoring bolt having a first wedge surface extending from the leading end thereof toward the trailing end for a portion of the axial length thereof and with the transverse cross-sectional area of said anchoring bolt for the axial length of said first wedge surface decreasing from the leading end toward the trailing end thereof, said spreading wedge having a second wedge surface extending from the leading end thereof for a portion of the axial length thereof with said second wedge surface extending angularly relative to the axis of said cylindrically shaped outer surface and being formed complementary to the first wedge surface of said anchoring bolt so that the transverse cross-sectional area of said spreading wedge for the length of said second wedge surface increases in the direction toward the trailing end thereof, said first and second wedge surfaces being in contacting relation so that the outer surfaces of said anchoring bolt and spreading wedge in the first position form the continuous cylindrically shaped outer surface of the fastening element assembly, wherein said spreading wedge intermediate and spaced from the leading and trailing ends thereof is shaped to provide a separating web joining axially extending parts of said spreading wedge with said separating web forming a predetermined breaking point so that when the predetermined breaking point is reached said separating web fractures and permits said part of said spreading wedge extending from said separating web toward the trailing end thereof to move axially toward the leading end of said anchoring bolt relative to said part of said spreading wedge extending from said separating web toward the leading end thereof.

2. Fastening element assembly, as set forth in claim 1, wherein said spreading wedge having a pair of grooves formed therein with said grooves being spaced apart in the axial direction of said fastening element assembly and with said separating web extending between said grooves.

3. Fastening element asssembly, as set forth in claim 1, wherein said grooves extend into said spreading wedge from opposite sides thereof with said grooves each extending into said spreading wedge in the direction transversely of the axial direction of said fastening element assembly for approximately half of the dimension between the opposite surfaces of said spreading wedge into which said grooves are formed.

4. Fastening element assembly, as set forth in claim 2, wherein said grooves each being formed into an opposite side of the cylindrically shaped outer surface of said spreading wedge and with said grooves extending into said spreading wedge for approximately half of the diameter of said cylindrically shaped outer surface.

5. Fastening element assembly, as set forth in claim 1, comprising a pair of grooves each extending into the cylindrically shaped outer surface of said spreading wedge from an opposite side thereof with said grooves being aligned and with the bottom surfaces of said grooves being spaced apart in the direction transversely of the axial direction of said fastening element assembly, a through-opening formed in said spreading wedge between said grooves and the trailing end thereof with said through-opening being aligned with the portion of said spreading wedge extending between the bottom surfaces of said grooves, said separating webs being formed between the adjacent surfaces of said through-openings and of said grooves, and said through-opening having a dimension in the direction extending transversely of the axial direction of said fastening assembly approximately equal to the spacing between the bottoms of said grooves.

6. Fastening element assembly, as set forth in claims 2, 3 or 4 wherein the bottom surfaces of said grooves extend approximately perpendicularly of said first wedge surface of said anchoring bolt.

7. Fastening element assembly, as set forth in claims 2, 3 or 4 wherein the bottom surfaces of said grooves are disposed in a plane extending parallel to the axis of said fastening element assembly.

8. Fastening element assembly, as set forth in claim 1, wherein said second wedge surface spaced from the leading end of said spreading wedge terminates intermediate the leading and trailing ends of said spreading wedge and said spreading wedge having a planar surface extending substantially parallel with the axis of said cylindrically shaped outer surface of said fastening element assembly from the trailing end of said second wedge surface to the trailing end of said spreading wedge, and grooves formed in the region of said planar surface adjacent the trailing end of said second wedge surface with said grooves being spaced apart and forming therebetween said separating web.

9. Fastening element assembly, as set forth in claim 1, wherein said cylindrically shaped outer surface of said anchoring bolt and spreading wedge being circular so that in the first position said anchoring bolt and spreading wedge form a continuous circular outer surface for said fastening element assembly.

* * * * *

UNITED STATES PATENT OFFICE
CERTIFICATE OF CORRECTION

Patent No. 4,312,611      Dated January 26, 1982

Inventor(s) Armin Herb

It is certified that error appears in the above-identified patent and that said Letters Patent are hereby corrected as shown below:

In the heading of the patent [22] should read as follows:

[22] Filed      March 26, 1980

Signed and Sealed this

Twentieth Day of April 1982

|SEAL|

Attest:

Attesting Officer

GERALD J. MOSSINGHOFF

Commissioner of Patents and Trademarks